United States Patent [19]

Grage

[11] Patent Number: 4,713,544
[45] Date of Patent: Dec. 15, 1987

[54] OPTICAL SYSTEM FOR THE SIMULTANEOUS RECEPTION OF THERMAL AND LASER RADIATION

[75] Inventor: Ludger Grage, Eichenau, Fed. Rep. of Germany

[73] Assignee: Siemens Aktiengesellschaft, Berlin and Munich, Fed. Rep. of Germany

[21] Appl. No.: 708,250

[22] Filed: Mar. 5, 1985

[30] Foreign Application Priority Data

Mar. 5, 1984 [DE] Fed. Rep. of Germany ....... 3408082
Feb. 21, 1985 [DE] Fed. Rep. of Germany ....... 3506088

[51] Int. Cl.$^4$ ............................................. G02B 26/10
[52] U.S. Cl. ................................... 250/334; 250/342; 250/353; 356/5
[58] Field of Search .................. 250/334, 342, 353; 356/5

[56] References Cited

U.S. PATENT DOCUMENTS

| | | | |
|---|---|---|---|
| 3,912,927 | 10/1975 | Hoffman | 250/234 |
| 4,575,632 | 3/1986 | Lange | 250/334 |
| 4,618,768 | 10/1986 | Weigel | 250/334 |

FOREIGN PATENT DOCUMENTS 0035101 9/1981 European Pat. Off. .
0117983 12/1984 European Pat. Off. .
3104318 8/1982 Fed. Rep. of Germany .
3048809 9/1982 Fed. Rep. of Germany .

*Primary Examiner*—Eugene R. LaRoche
*Assistant Examiner*—James C. Lee
*Attorney, Agent, or Firm*—Hill, Van Santen, Steadman & Simpson

[57] ABSTRACT

An optical receiving system for thermal radiation is useable, with slight modification, for the simultaneous, low-loss reception of laser radiation and is nevertheless still composed of standard, common modules. To this end, a geometrical out-coupling of the laser radiation out of the shared receiving channel following a scanner and the geometrical separation of the thermal and laser radiations is provided, whereby the out-coupled laser radiation, separated from the thermal radiation, is directed via a simple optical assembly onto a preferably shared sensor. For the utilization of the common reception channel and, thus, of the reception optics as well for the emission of the laser radiation, the transmission radiation can be coupled into the separated laser reception channel via a polarization separating filter. By so doing, the transmission optics is eliminated, whereby good optical conditions for the transmission radiation are established without deterioration of the common reception channel.

26 Claims, 19 Drawing Figures

OPTICAL SYSTEM FOR THE SIMULTANEOUS RECEPTION OF THERMAL AND LASER RADIATION

BACKGROUND OF THE INVENTION

Field of the Invention

The present invention relates to an optical system comprising a shared receiving channel for thermal and laser radiation which proceeds from a laser transmitter having an optical axis aligned parallel to the optical axis of the receiving channel, particularly for a thermal image device combined with a $CO_2$ laser range finder, whereby a scan mirror, an IR optics and at least one detector arrangement are provided in the receiving channel in the direction of radiation incidence, and comprising a position sensor for synchronizing the transmission point in time of the laser pulses with the angular position of the scan mirror.

Description of the Prior Art

Thermal image devices whose detectors are generally disposed row-like forming a line, and operate in the wave length range of 8–14 $\mu$m and which must be adequately cooled when operating are being increasingly employed for locating and targeting methods. To this end, all thermal image devices are equipped with a cooling system. Thermal image devices are combined with a laser range finder in order to be able not only to locate a subject emitting thermal radiation with a thermal image device but also to be able to measure the range of the located subject. This laser range finder can be integrated in the thermal image device. $CO_2$ lasers having a receiving detector whose sensitivity lies in the 10 $\mu$m range in accordance with the selected $CO_2$ line and which must likewise be cooled have been more and more frequently proposed recently for laser range finders. It therefore lies at hand, given thermal image devices that are combined wtih such lasers, to use the expensive components of these devices, in particular the receiving optics, the detectors utilized for the thermal image device and for the laser range finder and, therefore, the cooling systems necessary for these signal receivers, as extensively as possible for both purposes. The themal image detectors already present are therefore co-employed for the reception of the laser radiation or both a detector row for the image generation of the thermal image device as well as a single detector or a plurality of detectors for the laser range finder are applied to a common carrier. Given such a detector arrangement, the further advantage also derives that the receiving optics of the thermal image device can also be co-employed for the receiver of the laser range finder. Only one shared cooling apparatus and one shared receiving optics are therefore required given a thermal image device combined with a laser range finder wherein the detectors of the thermal image device are disposed on a common carrier together with the detectors of the receiver for the laser range finder.

An apparatus in which the foregoing is realized is known, for example, from the Gèrman Pat. No. 30 48 809, fully incorporated herein by this reference. Given a thermal image device with a laser transmitter and a shared thermal image/laser receiving channel, a common sensor arrangement is thereby provided which is composed of a sequential arrangement of single detectors for thermal radiation and another arrangement of single detectors or at least a bar detector, the further arrangement extending perpendicular to the detector row from the center of the image field. Given this known apparatus as in standard thermal image devices, the image production occurs vertically by way of the detector row and laterally by way of beam deflection on the basis of an oscillating sensing or scan mirror. The line of sight directed to the target and, threfore, the laser beam aligned to the line of sight describe a line in the imaging plane (detector plane) at right angles to the detector row. A single or bar detector disposed on this line, for example one of the central detectors from the row or an additional single detector disposed laterally relative to the row, is therefore suited for the detection of the laser radiation reflected from the target subject for the purpose of range finding. Given such an apparatus, therefore, only one shared cooling apparatus and one shared receiving optics are required for the thermal image device and the laser range finder.

Given the apparatus known from the aforementioned German Pat. No. 30 48 809, the laser beam reflected by the target is conducted via the scan mirror which executes periodic movements about an axis for the purpose of scanning the scene on the basis of the detector battery of the thermal image device. As a consequence, the incorporation of one or more specially designed batteries for the laser radiation as well in addition to an interference filter in the Dewar vessel of the thermal image device and, at the same time, the synchronization of the transmission time of the laser pulses with the position of the scan mirror are required. In order to simplify the detector configuration provided for two different types of radiation given this known apparatus, a further apparatus, known from the German published application No. 31 04 318 and for the incorporation herein by this reference, provides that a linear detector battery is employed jointly for thermal and laser radiation, that the laser radiation is coupled out of the beam path immediately following the IR telescope before reaching the scan mirror and is subsequently focused via an optical assembly containing the IR lens onto detectors located in the edge regions of the detector battery. To this end, laser radiation and thermal radiation are separated in a spectral divider/deflector, whereby the laser radiation is imaged onto the selected laser detector of the battery via a following optical assembly comprising a laser receiving lens, an IR lens, a lens at the image field side and a further spectral divider which reflects the thermal radiation and allows the laser radiation to pass, and whereby the thermal radiation reflected by the scan mirror is coupled into the optical assembly and, therefore, is coupled back into the common receiving channel and is likewise focused in the detector plane by the further spectral divider. The adjustment of the laser beam onto the laser detector is thereby achieved by rotating the spectral divider/deflector about its longitudinal axis. Given the apparatus known from the German published application No. 31 04 318, therefore, one no longer depends on the center detector of the battery or on additional single detectors disposed laterally on a line at right angles to the battery and thereby proceeds on the basis that the ends of the detector battery for thermal radiation contain detectors which are not employed for the representation of the thermal image. Thermal image devices which have not been initially designed for receiving laser radiation can then be made useable for the reception of laser radiation in a corresponding manner in that detectors for the reception of laser radiation located at the edge regions of the battery are employed. However, a corresponding number of lines in the thermal image are thereby lost. As a consequence of the type of separation and combination of laser reception and thermal image channel provided given the apparatus of the German published application No. 31 04 318, however, an unmodified series sensor can be utilized for the simultaneous reception of thermal and laser radiation, so that existing thermal image devices can be made useful for receiving laser radiation without modification of the detector arrangement. For the purpose of achieving this advantage, the known apparatus, however, provides two optical assemblies that contain relatively large optical components. Such additional optical assemblies therefore require a relatively large amount of space. Given the integration of two optical assemblies in existing thermal image devices, this space requirement can lead to difficulties in view of accommodating space provided therein and can then require a more extensive modifications of existing devices. Furthermore, the two optical assemblies for separating and combining laser and thermal radiation are designed with spectral layers, so that optical losses must be accepted both for the laser radiation and for the thermal radiation. A further disadvantage is that, given utilization of a prescribed detector in the row or battery provided for the reception of thermal radiation also for the reception of laser radiation, the size of the detector in combination with the focal length of the thermal image device is not matched to the divergence of the laser transmission beam.

The problems revealed illustrate that, given the adaptation of an existing optical system serving for receiving thermal radiation and for simultaneously receiving laser radiation, i.e. given the combination of an existing thermal image device with a laser range finder, it is particularly difficult to modify the existing optical system or the existing thermal image device in a cost-effective manner with only a few components such that it can continue to be constructed with a series of standard, so-called common modules and such that only low optical losses are caused by the modification.

SUMMARY OF THE INVENTION

Given resolution of the problem of making an existing optical system that serves for receiving thermal radiation and simultaneously for receiving laser radiation, the present invention is based on the object of providing a manner which, given the lowest possible optical losses for the thermal and laser radiation, enables the optical system for simultaneous reception of both raditions to continue to be constructed with a series of standard, common modules, enables that these modules already provided for receiving thermal radiation need not be modified at all or only need to be modified as slightly as possible, and that the additional components which may then become potentially necessary can be manufactured in an optimum cost-effective manner.

Given an optical system of the type initially mentioned, the above object is achieved, according to the present invention, in that a coupling out of the laser radiation from the shared receiving channel is provided following the scan mirror in the converging beam path at at least one location following the complete geometrical separation of the beam cones of the thermal radiation and of the laser radiation which proceed in different directions due to the movement of the scan mirror and the out-coupled laser radiation, separated from the thermal radiation, is directed via a respective optical assembly to a detector suitable for receiving the laser radiation.

With the optical system of the present invention, the thermal radiation and the laser radiation are conducted across the scan mirror in a shared receiving channel, are separated only thereafter and after the separation of the beam cones at the imaging side, whereby the thermal radiation is continued alone in the original, shared receiving channel and is directed unattenuated onto the detector battery. The laser radiation is therefore separated from the thermal radiation and is conducted to a suitable detector via a separate optical assembly. In order to be able to undertake an out-coupling of the laser radiation following a complete geometrical separation of the beam cones of the thermal and laser radiations, a synchronization of the transmission time of the laser pulses with the angular position of the scan mirror is, in fact, required. Given the optical system of the present invention, however, an out-coupling of only the laser radiation from the shared receiving channel via a geometrical beam division without spectral layers is realizable instead of a physical beam separation and recombination of the thermal and laser radiations with spectral dividers, so that the optical assembly for forwarding the out-coupling laser radiation to the detector arrangement only requires geometrically-deflecting elements. The additionally required components of the optical assembly can therefore be manufactured in a cost-effective manner and relatively small, so that the optical assembly can be simply constructed overall and has only a small space requirement. The out-coupling of the laser radiation given the optical system of the present invention can therefore be integrated into existing systems for receiving thermal radiation without difficulties and without particular modificatons. Moreover, the out-coupling of the laser radiation given the optical system of the present invention can be constructed with low losses since no physical separation of the two types of radiation occurs via spectral dividers, rather only a geometrical beam deflection of only the laser radiation via simple deflector elements is provided. The optical system of the invention also enables a common detector arrangement for the thermal and laser radiations to be provided on a single carrier, so that the optical system for the simultaneous reception of both radiations can also be constructed with a standard, common module with respect to the detector arrangement and an existing optical system for receiving thermal radiation which is composed of standard modules can be made usable without major modifications and with common modules for the reception of laser radiation at the same time.

An embodiment of an optical system, constructed in accordance with the present invention, which is particularly advantageous in view of the detector arrangement is obtained when a plurality of detectors (detector battery) is provided on a single carrier for receiving thermal radiation and for receiving laser radiation and the detector serving for receiving laser radiation lies in the edge regions of the detector battery. The detector for the reception of laser radiation is thereby preferably formed by a detector of the battery itself. Other detector arrangements are, however, also conceivable. It is therefore possible, for example, that the detector for receiving laser radiation is composed of an auxiliary detector lying in an extension of the battery arrangement but spatially offset therefrom. In the two latter instances, the advantage that only one cooling system is required derives on the basis of a shared detector arrangement, i.e. due to an arrangement of the detectors for thermal and laser radiations on a common carrier. When the detector for the reception of the laser radiation is formed by a detector of the battery arrangement itself, then the additional advantage derives that an existing detector arrangement already employed for previously-existing, standard thermal image devices can be simultaneously utilized without modification for the reception of thermal radiation as well as of laser radiation. When, by contrast, the detector for the reception of laser radiation is spatailly offset from the battery arrangement, then an existing detector arrangement only has to be slighty modified. This is also the case when a detector battery provided for the reception of the thermal radiation is provided on a single carrier and at least one additional detector for the reception of laser radiation lying on a line perpendicular to the battery arrangement is provided on the same carrier. It is also possible that one detector battery for the reception of the thermal radiation is provided on one carrier and that the detector for the reception of the laser radiation is disposed on a separate carrier which is spatially and physically separated from the carrier of the battery. Although this has the disadvantage of its own, discrete cooling for the detector of the reception of the laser radiation, it can yield certain system-oriented advantages, for example when the cooling of the detector arrangement for thermal radiation of this detector arrangement itself fails. In such a case, the laser range finding is still fully functional since it comprises a sensor arrangement which, of course, is completely independent from the reception of the thermal radiation.

Provided in a preferred manner for the out-coupling of the laser radiation from the shared receiving channel, given the optical system of the present invention, is an out-coupling element which is composed of a totally-reflective deflection element. Such an out-coupling element enables a particularly low-loss out-coupling of the laser radiation. The out-coupling element is thereby composed of a deflecting mirror or of a deflecting prism. The out-coupling element can also be a component of the optical assembly. Given the optical system of the present invention, however, an unmediated out-coupling of the laser radiation into the optical assembly is also possible, i.e. without an out-coupling element.

It is advantageous, given the optical system of the invention, when the out-coupling of the laser radiation from the shared receiving channel occurs when the scan mirror is respectively located in its reversing position. The influence of the unknown transit time of the laser pulses to a target and back can be largely diminished in this manner since the scan mirror is situated in its reversing positions for a short time in position of rest.

The optical assembly provided for an optical system constructed in accordance with the invention for forwarding the out-coupled laser radiation onto the detector arrangement suitable for laser reception is advantageously designed in such a manner that it contains an optically-imaging system which focuses the laser spot of an out-coupled laser radiation onto the detector serving for the reception of the laser radiation. It is thereby expedient when the imaging scale of the optically-imaging system is selected such that a matching of the laser spot given by the transmitter divergence and the focal length of the optical system for the reception of thermal radiation is undertaken to the size of the detector serving for the reception of the laser radiation.

It is also advantageous when the optical assembly contains an optical fiber, whereby it is particularly advantageous when the optical fiber is composed of a gradient fiber. Such a fiber enables a relatively large entry face given a small exit face and, therefore, enables a particularly good matching of the laser beam divergence to the size of the appertaining detector element. Given this arrangement, moreover, the motion of the scan mirror during the transit time of the laser pulses to the target and back can also be taken into consideration.

A modified embodiment of an optical system, constructed in accordance with the invention, provides that the last member of the optical assembly is composed of a deflector element in the form of an in-coupling element transmissive for thermal radiation which is disposed immediately in front of the detectors serving for the reception of the thermal radiation and of the laser radiation and composed of a battery arrangement and which has its section lying in front of the detector for laser radiation fashioned with a spectral divider layer which reflects the laser radiation in the direction to this detector. This solution is advantageous when the detectors provided for receiving laser radiation are covered by one in-coupling element in the edge region of the detector arrangement for receiving thermal radiation because they can then be co-employed for receiving thermal radiation, even taking a certain attenuation into consideration. Only the edge region thereby suffers certain optical losses. One advantage of this solution, however, lies in the smaller and less expensive structure in comparison to known spectral units.

Given the optical system of the invention, finally, an out-coupling of the laser radiation is also possible at two locations following the complete geometrical separation of the beam cones of the thermal radiation and of the laser radiation, preferably in the reversing positions of the scan mirror. Although a respective optical group is thereby to be provided for each out-coupling, a duplication of the out-coupling of the present invention of the laser radiation nonetheless has the advantage that the respectively optimum adaptation can be selected given magnification switching of the system or, respectively, given divergence switching of the laser.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
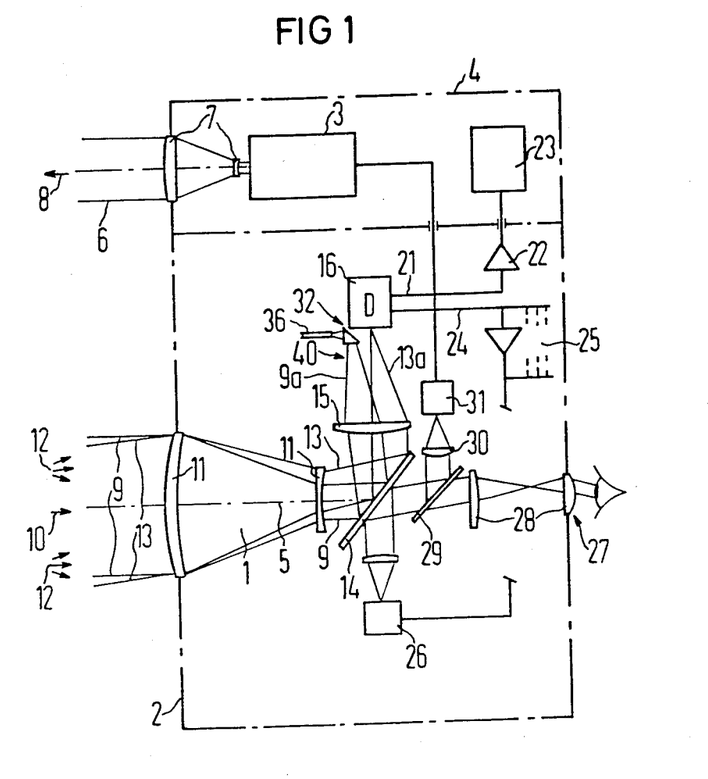
FIG. 1 is a schematic representation of an optical system for simultaneous reception of thermal and laser radiations, which is realized in a thermal image device combined with a laser range finder having a common receiving channel for the thermal radiation and the laser radiation.
Figure 2:
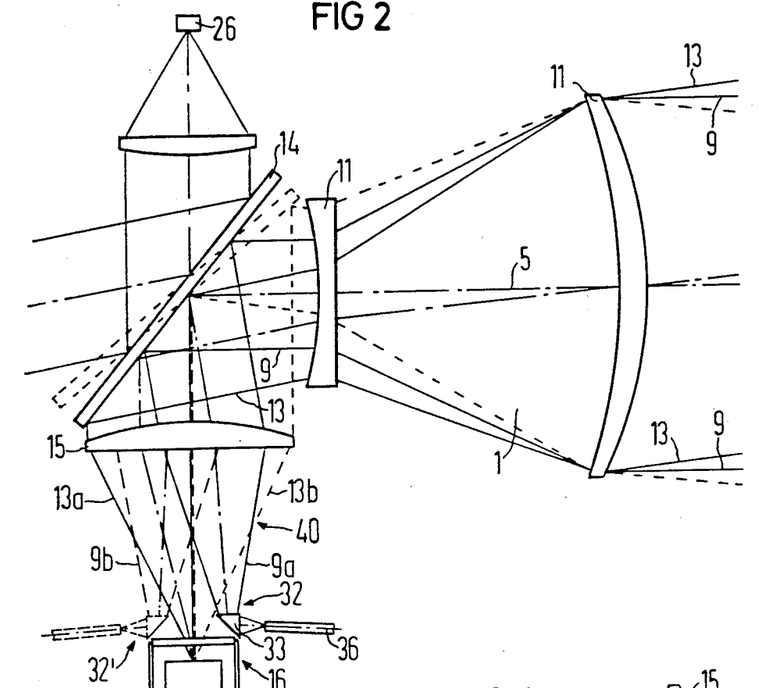
FIG. 2 is a schematic representation of the beam path in the common receiving channel comprising a detector arrangement, a scan mirror and an out-coupling of the laser radiation from the common receiving channel.
Figure 3:
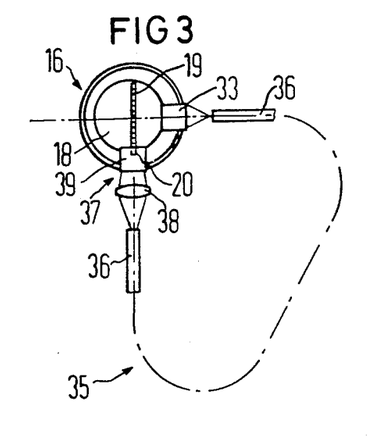
FIG. 3 is a plan view of the optical system in the region in front of the detector arrangement with the out-coupling of the laser radiation via an optical assembly.
Figure 4:
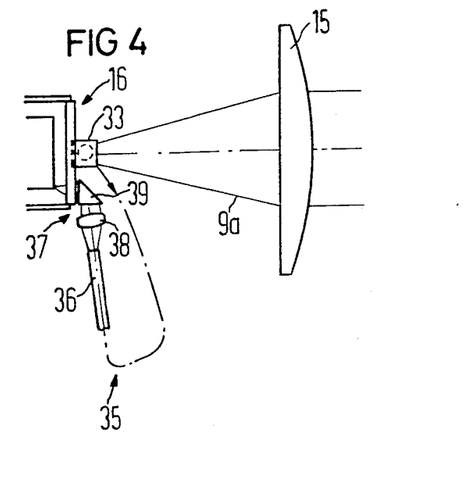
FIG. 4 is a side view of the optical system in the region in front of the detector arrangement with the out-coupling of the laser radiation via an optical assembly.
Figure 16:
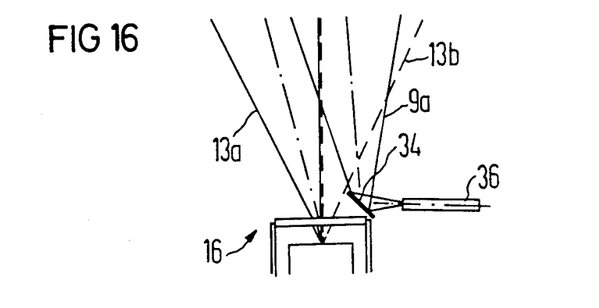
FIG. 16 is a side view of the out-coupling of the laser radiation by way of an out-coupling element designed as a deflecting mirror.

FIG. 1 illustrates an optronic apparatus comprising a thermal image device and a laser range finder, whereby the thermal image device and the common receiving channel 1 for the thermal radiation and the laser radiation are disposed in a first housing 2 and the laser transmitter 3 is disposed in a second housing 4 and the two housings are rigidly connected to one another. The laser transmitter 3 is thereby coupled to the common receiving channel 1 such that the optical axis of the laser transmitter is aligned parallel to the optical axis 5 of the receiving channel which, at the same time, represents the line of sight of the thermal image device. The laser radiation 6 to be emitted is focused by a transmission telescope 7 and is beamed out in the direction of the arrow 8 towards a target (not shown). The laser radiation 9 reflected by the target impinges the common receiving optics 11 for thermal radiation and laser radiation in the direction of an arrow 10 and passes through the optics 11 parallel to the optical axis 5 of the receiving channel 1 and into the afocal part of the receiving optics. Both radiations, the laser radiation 9 and the thermal radiation 13 depart the afocal part as parallel ray beams and impinge a scan mirror 14 on both sides which serves in a known manner for generating a thermal image i.e. for writing a line of the thermal image, whereby the mirrored back side of the scan mirror serves in a fashion that is likewise known for the reproduction of the thermal image in the visible range. Such image generating and reproduction methods are generally known in thermal imaging technology, for example from the periodical "Wehrtechnik" October 1980, pp. 21–23, the German allowed application 23 32 245 and the U.S. Pat. No. 2,989,643, all of which are fully incorporated herein by this reference. The parallel ray beams of the thermal radiation and of the laser radiation deflected by the scan mirror 14 are directed by an imaging IR optics 15 onto a detector arrangement 16 which is disposed in the image plane of the IR optics. The beam cones 13a and 13b (FIG. 2) of the thermal radiation generated by the pivoting scan motion of the scan mirror and shown for the reversing positions thereof are thereby focused onto the detector arrangement 16, whereas the beam cones 9a and 9b of the -laser radiation, likewise shown for the reversing positions of the scan mirror, proceed in different directions due to the movement of the scan mirror and the laser radiation is coupled out of the common receiving channel 1 at least one location following the complete geometrical separation of the beam cones of the thermal and laser radiations, for example in the region of the cone 9a or in the region of both cones 9a and 9b, and the out-coupled laser radiation, separated from the thermal radiation, is directed via a respective optical assembly 35 (FIGS. 3 and 4) onto a detector suitable for receiving laser radiation. In the illustrative embodiment of FIGS. 1–4, a single detector arrangement 16 is provided for receiving the thermal radiation and the laser radiation, the detector arrangement 16 being composed of a detector battery 19, for example a row of 180 detectors, disposed on a single carrier 18, whereby the detector serving for receiving laser radiation lies in the edge region of the detector battery and is then expediently formed by a detector 20 of the detector battery 19 itself. The detector arrangement 16 converts the received thermal or, respectively, laser radiation into electrical signals, whereby the electrical output signals 21 (FIG. 1) of the detector arrangement stemming from the laser radiation are supplied in a standard manner via an amplifier 22 to, for example, an evaluation electronics 23 located in the second housing 4 which converts the transit time of the laser transmission pulses into range values and displays the measured range, whereas the electrical output signals 24 stemming from the thermal radiation are supplied in a likewise standard manner, for example in the manner known from the references cited above, via a multi-channel amplifier device 25 to a light emitting diode (LED) arrangement 26 which then converts the amplified electrical output signals into visible light so that the thermal image, now in the visible range, is mirrored in a known manner into an ocular or a sighting device 27 via the mirrored rear side of the scan mirror 14. Another beam splitter 29 is disposed between the rear side of the scan mirror 14 and an imaging optics 28 of the sighting device, the beam splitter 29 supplying a slight portion of a radiation to a scan position sensor (SPS) 31 via a further imaging optics 30. The scan position sensor is an opto-electrical sensor which synchronizes the transmission time of the laser pulses with the angular position of the scan mirror, and thus triggers the laser transmitter 3, i.e. determines the position of the scan mirror and triggers the laser pulse in the correct position of the mirror. The correct position of the scan mirror is provided in the present case when the laser radiation reflected by the target, received and incident parallel to the axis, is directed to that location or those locations due to the movement of the scan mirror at which the out-coupling of the laser radiation occurs out of the common receiving channel. In the illustrative embodiment of FIGS. 1-4, a mediated out-coupling of the laser radiation is provided via an out-coupling element 32 which comprises a totally-reflective deflector element. As is apparent from the foregoing, the out-coupling element is disposed such that the out-coupling of the laser radiation from the common receiving channel occurs when the beam cones of the thermal radiation and of the laser radiation, for example the beam cones 9a and 13b are completely geometrically separated from one another. The out-coupling preferably occurs when the scan mirror 14 is located in its reversing position. The reversing positions of the scan mirror are illustrated in FIG. 2 in solid and broken lines, respectively. A further out-coupling element 32', shown in broken lines in FIG. 2, together with the beam cone 9b of the laser radiation indicates that the out-coupling of the laser radiation can also be executed at that side lying opposite the beam cone 13b after the complete geometrical separation of the beam cones of the thermal and laser radiation. In this case, an out-coupling of the laser radiation occurs at every reversing position of the scan mirror. A reflecting prism 33, which is illustrated as a roof prism in FIG. 2, is provided as the out-coupling element in the illustrative embodiment of FIGS. 1-4. As shown in FIG. 16, however, the out-coupling element can also comprise a deflecting mirror 34. Advantageously, the out-coupling element 32 or, respectively, 32' is adjustable with reference to the optical axis of the overall system. Moreover, the out-coupling element can be a component of an optical assembly 35 which is provided for directing the out-coupled laser radiation onto the detector 20 suitable for receiving the laser radiation (FIGS. 2 and 5) and directing it separated from the thermal radiation. Given the illustrative embodiment of FIGS. 1-4, the optical assembly 35 following the reflecting prism 33 provided as the out-coupling element comprises an optical fiber 36, particularly a gradient fiber, whose begining end is disposed in the image spot of the IR optics 15, and of an optical imaging system 37 comprising a lens system 38 and a deflector element 39 likewise designed, for example, as a roof prism which focuses the laser spot of the laser radiation emerging from the optical fiber 36 onto a detector 20, as best seen in FIG. 3. The imaging scale of the optical imaging system 37 is thereby selected such that a matching of the laser spot to the size of the detector 20 occurs.

Although, given the optical system of the invention, the out-coupling is fundamentally provided following the scanner 14 in the converging portion 40 of the beam path at one or more locations after the complete geometrical separation of the beam cones 13a, 13b or, respectively, 9a, 9b of the thermal and laser radiations which proceed in different directions due to the movement of the scan mirror, different embodiments deviating from the embodiment illustrated in FIGS. 1-4 are possible for the manner of out-coupling of the laser radiation from the common receiving channel and for the design of the optical assembly as well as for the detector arrangement. These shall be described in greater detail below with reference to FIGS. 6-10, 13-15 and 17.

Figure 17:
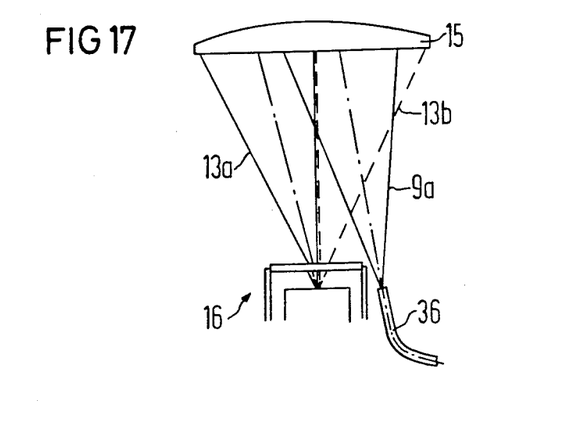
FIG. 17 is a side view of the out-coupling of the laser radiation without a separate out-coupling element immediately into an optical assembly.

In contrast to the mediated out-coupling of FIGS. 1-4 via an out-coupling element, FIG. 17 shows an immediate out-coupling of the laser radiation 9a out of the common receiving channel, whereby the laser radiation is coupled directly to an optical fiber 36 of an optical assembly without an out-coupling element and the beginning end of the optical fiber is again disposed in the image spot of the IR optics 15.

Figure 13:
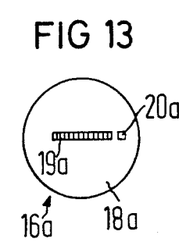
FIG. 13 is a plan view of a detector arrangement for the shared receiving of thermal and laser radiation.
Figure 14:
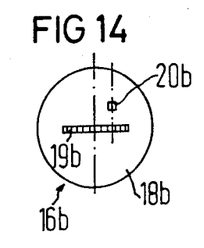
FIG. 14 is a plan view of another detector arrangement for the shared reception of thermal and laser radiations.
Figure 15:
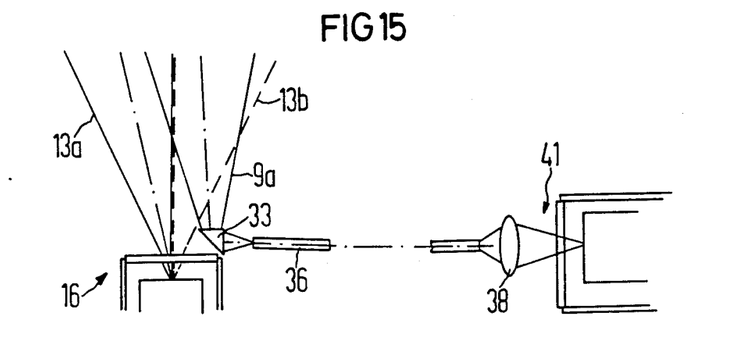
FIG. 15 is a side view of the out-coupling of the laser radiation onto a separate detector arrangement.

Various detector configurations are illustrated in FIGS. 13-15. According to FIG. 13, therefore, a shared detector arrangement 16a for receiving the thermal and laser radiations is provided on a single carrier 18a and another detector battery 19a is provided for receiving the thermal radiation, but the detector for receiving laser radiation comprises an auxiliary detector 20a lying in the extension of the row 19a but spatially offset therefrom.

FIG. 14 again provides a common detector arrangement 16b on a single carrier 18b comprising a detector battery 19b for receiving thermal radiation; however, at least one additional detector 20b lying on a line perpendicular to the battery 19b is provided for receiving laser radiation.

Instead of a shared detector arrangement for receiving thermal radiation and laser radiation disposed on a single carrier, it is also possible that, as in the illustrative embodiment in FIGS. 1-4, a detector battery 19 is provided on a carrier 18 for receiving thermal radiation, whereas the detector for receiving laser radiation is disposed on a separate carrier 41 that is spatially and physically separated from the carrier 18 of the detector battery 19 (FIG. 15).

Finally, various optical assemblies are illustrated in FIGS. 5-12.

Figure 5:
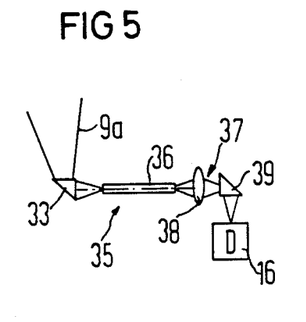
FIG. 5 is a schematic representation of a first embodiment of an optical assembly which may be used for the out-coupling of the laser radiation.

An optical assembly 35, such as employed in the illustrative embodiment of FIGS. 1-4, is shown in detail in FIG. 5. This assembly comprises an out-coupling element 33, the optical fiber 36, and the optical imaging system 37 which, in turn, comprises a lens 38 and a deflector element 39.

Figure 6:
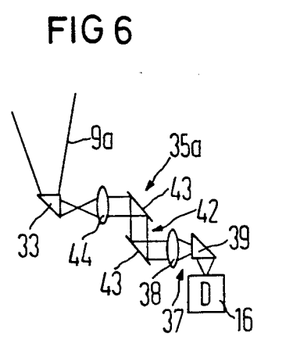
FIG. 6 is a schematic representation of a second embodiment of an optical assembly which may be used for the out-coupling of the laser radiation.

The optical assembly 35a of FIG. 6 comprises an out-coupling element 33, a first optical imaging system 37 in front of the detector arrangement, a deflecting system 42 preceding the optical imaging system and two deflecting mirrors 43 parallel to one another which are disposed, in this case, such that they deflect the out-coupled laser radiation parallel to itself, and a second optical imaging system 44 preceding the deflecting system 42.

Figure 7:
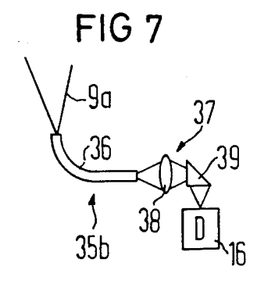
FIG. 7 is a schematic representation of a third embodiment of an optical assembly which may be used for the out-coupling of the laser radiation.
Figure 9:
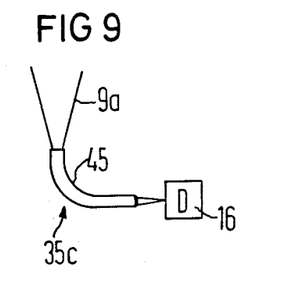
FIG. 9 is a schematic representation of a fifth embodiment of an optical assembly which may be used for the out-coupling of the laser radiation.

In contrast to FIGS. 5 and 6, the illustrative embodiment of FIG. 7 provides an unmediated out-coupling of the laser radiation. The optical assembly 35b thereby comprises only an optical fiber 36 and an optical imaging system 37 comprising a lens system 38 and a deflector element 39. As shown in FIG. 9, however, the optical imaging system can also be an integral component of the optical fiber 45 and can then be provided at the end of the optical fiber. The optical assembly 35c therewith comprises only the optical fiber 45.

Figure 8:
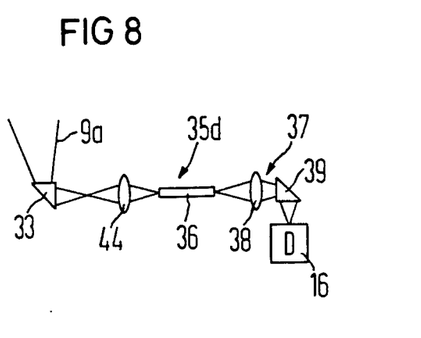
FIG. 8 is a schematic representation of a fourth embodiment of an optical assembly which may be used for the out-coupling of the laser radiation.

The optical assembly 35d of FIG. 8, as in FIG. 6, comprises, in addition to the out-coupling element 33, the otpical imaging system 37 comprising a lens system 38 and a deflector element 39 in front of the detector arrangement 16 and a second optical imaging system 44 following the out-coupling element 33, and is designed with an optical fiber 36 instead of a deflecting system.

Figure 10:
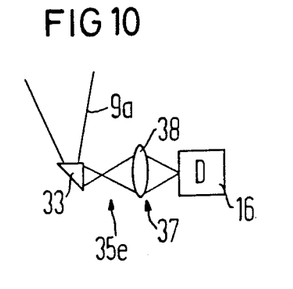
FIG. 10 is a schematic representation of a sixth embodiment of an optical assembly which may be used for the out-coupling of the laser radiation.

The optical system 35e of FIG. 10 comprises only an out-coupling element 35 and an optical imaging system 37 which includes the lens system 38.

Figure 11:
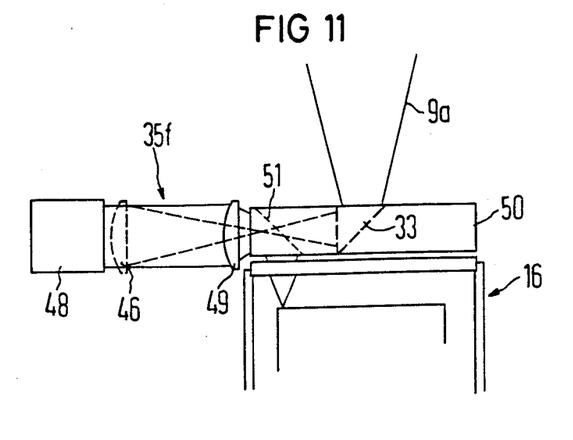
FIG. 11 is a side view in the region in front of the detector arrangement comprising another embodiment of the optical assembly for the out-coupling of the laser radiation.
Figure 12:
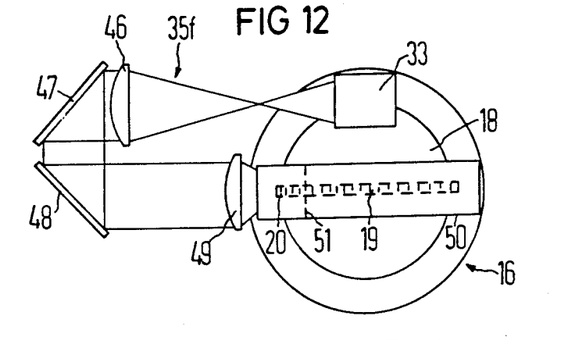
FIG. 12 is a plan view of the apparatus of FIG. 11.

The optical assembly of 35f of FIGS. 11 and 12, finally, comprises a first totally reflective deflector element 33 for out-coupling, a first optical imaging system 46, two totally reflective deflecting mirrors 47 and 48 which are disposed such that they deflect radiation by 180°, a second optical imaging system 49 and a further deflector element in the form of an in-coupling element 50 which is transmissive for thermal radiation and which is disposed immediately in front of the detectors 19 composed of a battery arrangement and serving for the reception of the thermal radiation and the laser radiation. The in-coupling element is fashioned in that section lying in front of the detector 20 for laser radiation with a spectral divider layer 51 which reflects the laser radiation in the direction towards the detector 20. As for example, in the embodiment of FIGS. 1–4, the detector for the reception of laser radiation can be formed by a detector 20 in the edge region of the battery 19 or can also be formed by an additional detector.

In the subject matter of FIGS. 1–17 as well as in a first exemplary embodiment of the apparatus known from the DE-OS No. 31 04 318, the transmission beam departing from the laser transmitter is beamed out parallel to the optical axis of the reception channel via a separate transmission optics. Given another exemplary embodiment of the known apparatus, the transmission beam is coupled into the reception channel by means of a deflecting prism proceeding perpendicular to the optical axis of the reception channel which projects thereinto and can be pivoted out of this position and is then transmitted via the IR telescope thereof. In this fashion, a separate transmission optics for the laser beam to be beamed out is eliminated, whereby the required deflecting prism is cheaper than a Galilei telescope which would otherwise be required. For coupling the transmission beam into the reception channel, however, the deflecting prism must be pivoted into the reception channel so that it projects thereinto, even if only with that end comprising the second deflecting prism face. As a consequence, a part of the reception channel is placed in shadow. Furthermore, the transmission beam is thereby coupled into the edge region of the optics, so that the use of this part of the optics which is generally poorer in terms of the optical quality in comparison to the central region must be accepted for the transmission beam. Finally, poorer bundling properties occur given a partial utilization of the optics in comparison to a full utilization of the optics. This is disadvantageous in view of the divergency of the laser beam and, thus, particularly disadvantageous given laser range-finders, since these require a high degree of bundling of the beam to be beamed out.

It is therefore the object of an improvement of the invention to also make the common transmission channel and the reception optics shared by the thermal and laser radiation usable for the emission of the laser beam and thereby guaranteeing optimally good optical conditions for the transmission radiation without deteriorating the reception channel.

This object is achieved in that the laser radiation departing the laser transmitter is beamed out via the separated laser reception channel and the common reception channel; in that a polarization separating filter known per se is provided in the separated laser reception channel for the separation of the laser transmission beam and the laser reception beam; and in that an optical element is provided in the beam path in front of the IR optics, this optical element forming a transmission telescope together with the IR optics.

Given such an optical system, the transmission radiation is thus not beamed out via its own transmission optics but is coupled into the separated laser reception channel and beamed out via the reception optics. The common reception channel with the common reception optics is thus utilized for beaming out the laser beam. A direct engagement of optical elements into the common reception channel is thereby avoided as a result of coupling the transmission radiation into the separated laser reception channel, so that the reception channel is not shaded and the reception optics is fully usable for the emission of the transmission beam. In this fashion, good optical conditions are given for the transmission radiation in the optical system of the invention without deteriorating the reception channel. The transmission beam divergence can therefore be kept very small.

Figure 18:
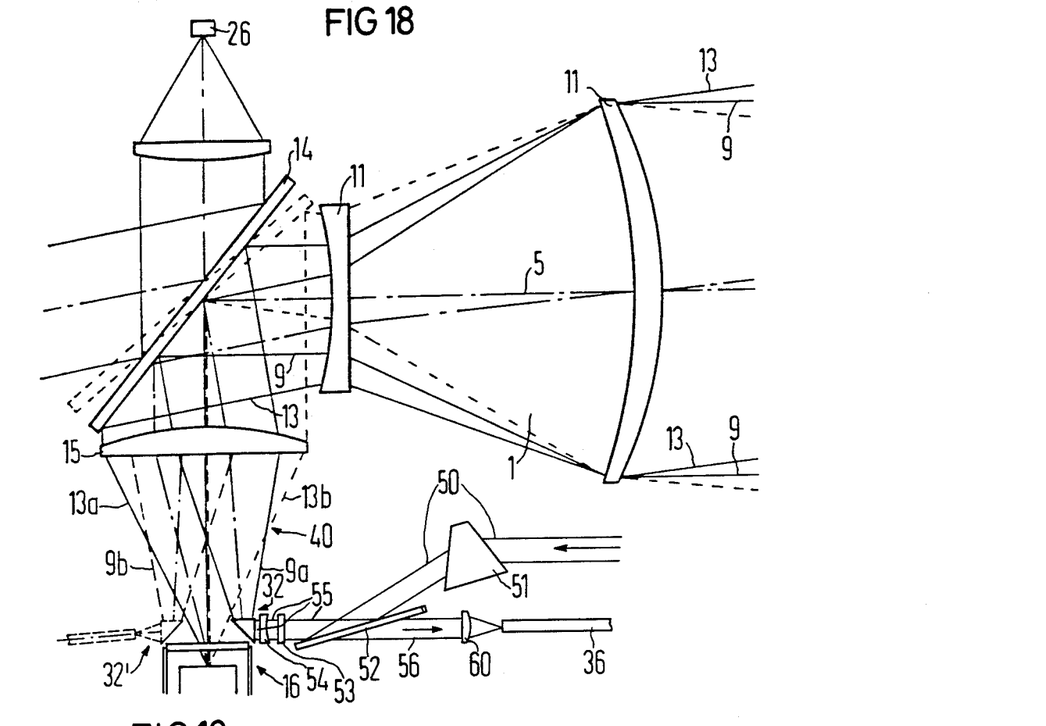
FIG. 18 illustrates the beam course in the common reception channel with a scan mirror, a detector arrangement, an out-coupling of the laser radiation out of the common reception channel and in-coupling of the transmission radiation into the separated laser reception channel.
Figure 19:
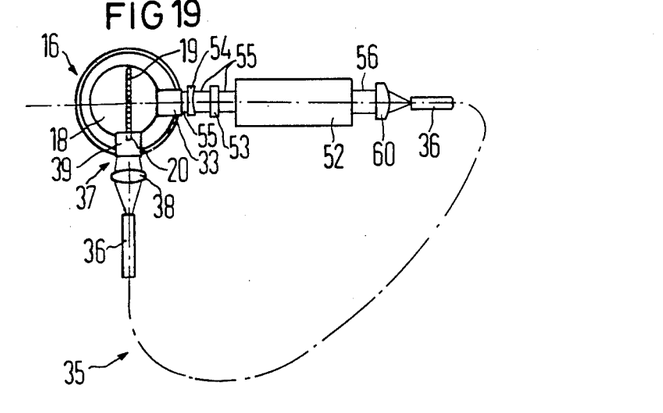
FIG. 19 is a plan view of an arrangement of FIG. 18 in the region in front of the detector arrangement.

In order, then, to exploit the common reception channel and, thus, the reception optics as well for the emission of the laser beam given the present optical system, the transmission beam 50 according to FIGS. 18 and 19 is not, as in FIG. 1, beamed out via its own transmission channel, but is coupled into the separated laser reception channel 55 via a polarization separating filter and beamed out via the reception optics. The in-coupling here ensues in such fashion that the linearly polarized laser radiation 50 proceeding from the laser transmitter (not shown) which is spatially segregated or integrated in the apparatus—said laser radiation being directed toward the separated laser reception channel 55 by a deflector element under given conditions—is coupled into the separated laser reception channel 55 by means of a polarization-selective element 52, which herein is specifically composed of a Brewster plate, and is then deflected into the beam path of the common reception channel 1. A quarter-wave plate 53 following the Brewster plate 52 in the emission direction is disposed in the separated laser reception channel 55.

Upon passage through the quarter-wave plate 53, the linearly polarized laser transmission radiation is circularly polarized. A following negative element 54 is disposed preceding the out-coupling element 32 and is dimensioned such that it forms a transmission telescope with the IR optics 15. The laser transmission radiation is beamed out to a target subject via this transmission telescope, the scan mirror 14, the common reception channel 1 and the common reception optics 11. The triggering of the laser—as already mentioned—occurs in the reversing time of the scan mirror, whereby this point in time is determined with the position sensor 31 (FIG. 1). A part of the laser radiation reflected by the target subject returns via the same path, but is again linearly polarized upon passage through the quarter-wave plate 53, namely by 90° relative to the original polarization direction. This linearly polarized radiation rotated by 90° relative to the transmission radiation 50 impinging on the Brewster plate 52 now passes through the Brewster plate 52 and proceeds to the detector as laser reception radiation 56 via the path as described above, i.e. via the optical assembly 35. As FIGS. 2 and 3 also show, the entire in-coupling of the laser transmission beam into the separated laser reception channel 55 is integrated between the out-coupling element 32 and the optically imaging system 60 of the optical assembly 35.

Given the illustrative embodiment shown in FIGS. 18 and 19, the Brewster plate 52 is disposed such that the laser transmission radiation 50 is reflected at the Brewster plate and is then coupled into the separated laser reception channel 55, whereas the laser reception radiation 56 passes through the Brewster plate into the optical assembly 55. However, given a polarization direction of the laser transmission radiation rotated by 90° in comparison to the illustrative embodiment of FIGS. 18 and 19, it is also possible to transpose the channels in such fashion that the laser transmission radiation coming from the laser transmitter is coupled into the separated laser reception channel 55 passing through the Brewster plate 55 whereas the laser reception radiation is reflected at the Brewster plate and steering into the optical assembly 35.

Instead of discrete elements, it is also moreover possible to unite the optical element 54, the out-coupling element and, under given conditions, the quarter-wave plate 53 as well as to form a single element, or respectively, to combine them to form a mechanical unit.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An optical system for receiving laser radiation and thermal radiation, comprising:
   a laser transmitter having an optical transmission axis and combined with a thermal image device,
   scan means including a movable scan mirror operable to cyclically pivot back and forth;
   a common receiving channel having an optical axis parallel to the optical axis of the transmitter laser, for receiving laser and thermal radiations and directing the same onto said scan mirror;
   separation means optically coupled to said scan mirror for separating the laser and thermal radiations into separate convergent beam cones which proceed in different directions due to the movement of said scan mirror;
   detector means; and
   out-coupling means for receiving and coupling the separated radiations onto said detector means.

2. The optical system of claim 1, wherein:
   said detector means comprises a single carrier and a plurality of detectors arranged in a row on said single carrier with one of said detectors at the end of the row dedicated to receive the separated laser radiation.

3. The optical system of claim 1, wherein:
   said detector means comprises a carrier and a plurality of detectors arranged in a row on said carrier for the separated thermal radiation, and a further detector aligned with and spaced from said row for receiving the separated laser radiation.

4. The optical system of claim 1, wherein:
   said detector means comprises a carrier and a plurality of detectors arranged in a row on said carrier for the separated thermal radiation, and a further detector spaced offset from said row for receiving the separated laser radiation.

5. The optical system of claim 4, wherein:
   said carrier is a single carrier also mounting said further detector and said further detector is on a line perpendicular to said row.

6. The optical system of claim 1, wherein:
   said detector means comprises spaced apart first and second carriers, a plurality of first detectors mounted aligned on said first carrier for receiving the separated thermal radiation, and at least one second detector mounted on said second carrier for receiving the separated laser radiation.

7. The optical system of claim 1, wherein:
   said out-coupling means comprises a reflective deflector for out-coupling the separated laser radiation.

8. The optical system of claim 7, wherein:
   said deflector comprises a deflecting mirror.

9. The optical system of claim 7, wherein:
   said deflector comprises a reflecting prism.

10. The optical system of claim 1, wherein:
    said out-coupling means comprises at least one optical imaging system for focusing the laser spot of its separated beam cone onto said detector means.

11. The optical system of claim 10, wherein:
    said detector means comprises a laser radiation detector of a predetermined size and said imaging means matches the laser spot to that predetermined size.

12. The optical system of claim 1, wherein:
    said out-coupling means comprises an optical fiber.

13. The optical system of claim 12, wherein:
    said optical fiber comprises a gradient optical fiber.

14. The optical system of claim 1, wherein:
    said out-coupling means comprises a guidance system for guiding the separated laser radiation and an optical imaging system for focusing the deflected radiation onto said detector means.

15. The optical system of claim 14, wherein:
    said guidance system comprises deflecting means.

16. The optical system of claim 14, wherein:
    said guidance system comprises an optical fiber.

17. The optical system of claim 14, wherein:
    said out-coupling means comprises a further optical imaging system for receiving and focusing the separated laser radiation onto said guidance system.

18. The optical system of claim 14, wherein:
    said optical imaging system comprises a lens system and a deflector.

19. The optical system of claim 1, wherein:
    said detector means comprises a plurality of aligned first detectors for receiving the separated thermal radiation, a second detector for receiving the separated laser radiation, and a coupling element transmissive to thermal radiation covering said detectors and including a spectral divider for reflecting the separated laser radiation towards said second detector.

20. The optical system of claim 1, wherein:
    said out-coupling means comprises an out-coupling element positioned to receive the separated laser radiation when said scan mirror is in a predetermined position.

21. In an optical system for the reception of thermal and laser radiation, particularly for a thermal image device combined with a $CO_2$ laser range finder, comprising a common reception channel containing a reception optics, a scan mirror, an IR optics and at least one detector arrangement and a position sensor for the synchronization of the transmission time of the laser pulses of the laser transmitter with the angular position of the scan mirror, whereby an out-coupling of the laser reception radiation out of the common reception channel is provided following the scan mirror in the converging beam path at at least one location following the complete geometrical separation of the ray cones of the thermal and of the laser reception radiation which proceed in different directions due to the movement of the scan mirror and the out-coupled laser reception radiation is directed in a laser reception channel separated from the thermal radiation to a detector suitable for the reception of the laser radiation, being directed thereto via a respective optical assembly, the improvement comprising: means for providing that the laser radiation outgoing from the laser transmitter is beamed out via the separated laser reception channel (55) and the common reception channel (1); a polarization separation filter is in the separated laser reception channel (55) for the separation of the laser transmission and the laser reception radiation (50 and 56, respectively); and an optical element (54) forming a transmission telescope with the IR optics is in the transmission beam path preceding the IR optics (15).

22. The optical system according to claim 21, wherein the polarization separating filter is composed of a polarization-selective element (52) and of a quarter-wave plate (53) following this element in emission direction.

23. The optical system according to claim 22, wherein the polarization-selective element (52) is a Brewster plate.

24. The optical system according to claim 23, wherein the Brewster plate (52) is disposed such that the laser transmission radiation (50) is coupled into the separated laser reception channel (55) via reflection at the Brewster plate and the laser reception radiation (56) passes through the Brewster plate.

25. The optical system according to one of the claim 21, wherein the optical element (54) is composed of an optical negative element disposed between the polarization separating filter and the IR optics (15).

26. The optical system according to one of the claim 21, wherein a deflecting element (51) directing the laser transmission radiation (50) to the separated laser reception channel (55) is provided preceding the polarization separating filter.

* * * * *